United States Patent
Lin

(10) Patent No.: US 7,120,822 B2
(45) Date of Patent: Oct. 10, 2006

(54) COMPUTER EXECUTABLE DIGITAL VIDEO RENDERING RESTORATION METHOD

(75) Inventor: Brian Lin, Taipei (TW)

(73) Assignee: Cyberlink Corp., Taipei Hsien (TW)

( * ) Notice: Subject to any disclaimer, the term of this patent is extended or adjusted under 35 U.S.C. 154(b) by 778 days.

(21) Appl. No.: 10/378,943

(22) Filed: Mar. 5, 2003

(65) Prior Publication Data

US 2004/0083322 A1    Apr. 29, 2004

(30) Foreign Application Priority Data

Oct. 25, 2002   (TW)  .............................. 091125288 A

(51) Int. Cl.
 *G06F 11/00*   (2006.01)
(52) U.S. Cl. ................... 714/6; 714/5; 714/20; 714/54; 348/441; 725/9
(58) Field of Classification Search ................... 714/2, 714/5, 6, 20, 54; 348/441–459; 725/9, 14, 725/25, 105, 135
See application file for complete search history.

(56) References Cited

U.S. PATENT DOCUMENTS 6,438,275 B1 *   8/2002   Martins et al. ............. 382/300
7,043,745 B1 *   5/2006   Nygren et al. ................. 725/9

* cited by examiner

*Primary Examiner*—Scott Baderman
*Assistant Examiner*—Timothy M. Bonura
(74) *Attorney, Agent, or Firm*—Birch, Stewart, Kolasch & Birch, LLP

(57) ABSTRACT

A computer executable digital video rendering restoration method is disclosed. Through setting a saving interval, data of states during the rendering process of digital videos are recorded periodically. When the rendering process is abnormally interrupted, the state data in the record file can be immediately used to restore the digital video before the last recording so that the user can continue the digital video rendering.

12 Claims, 2 Drawing Sheets

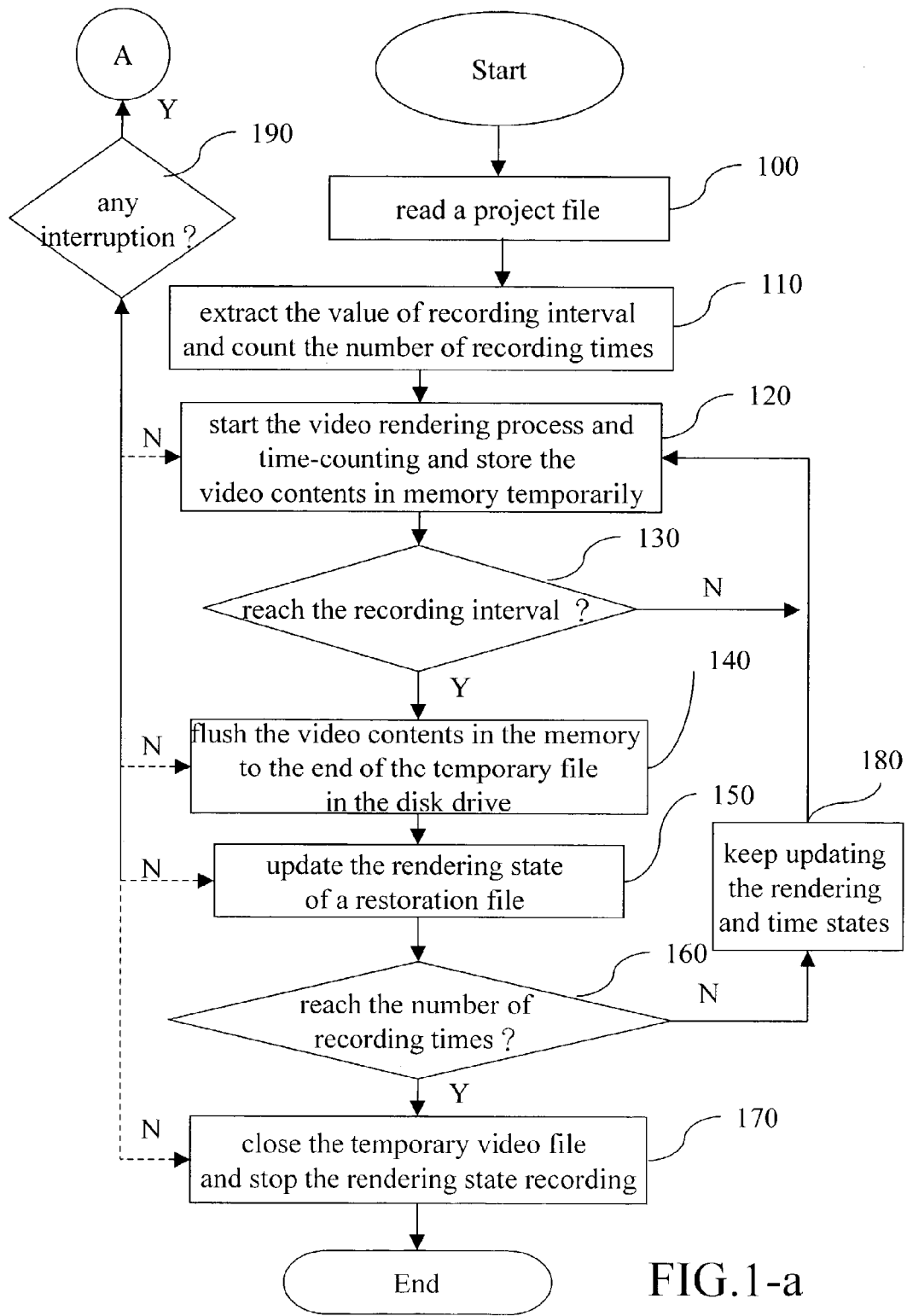
FIG.1-a

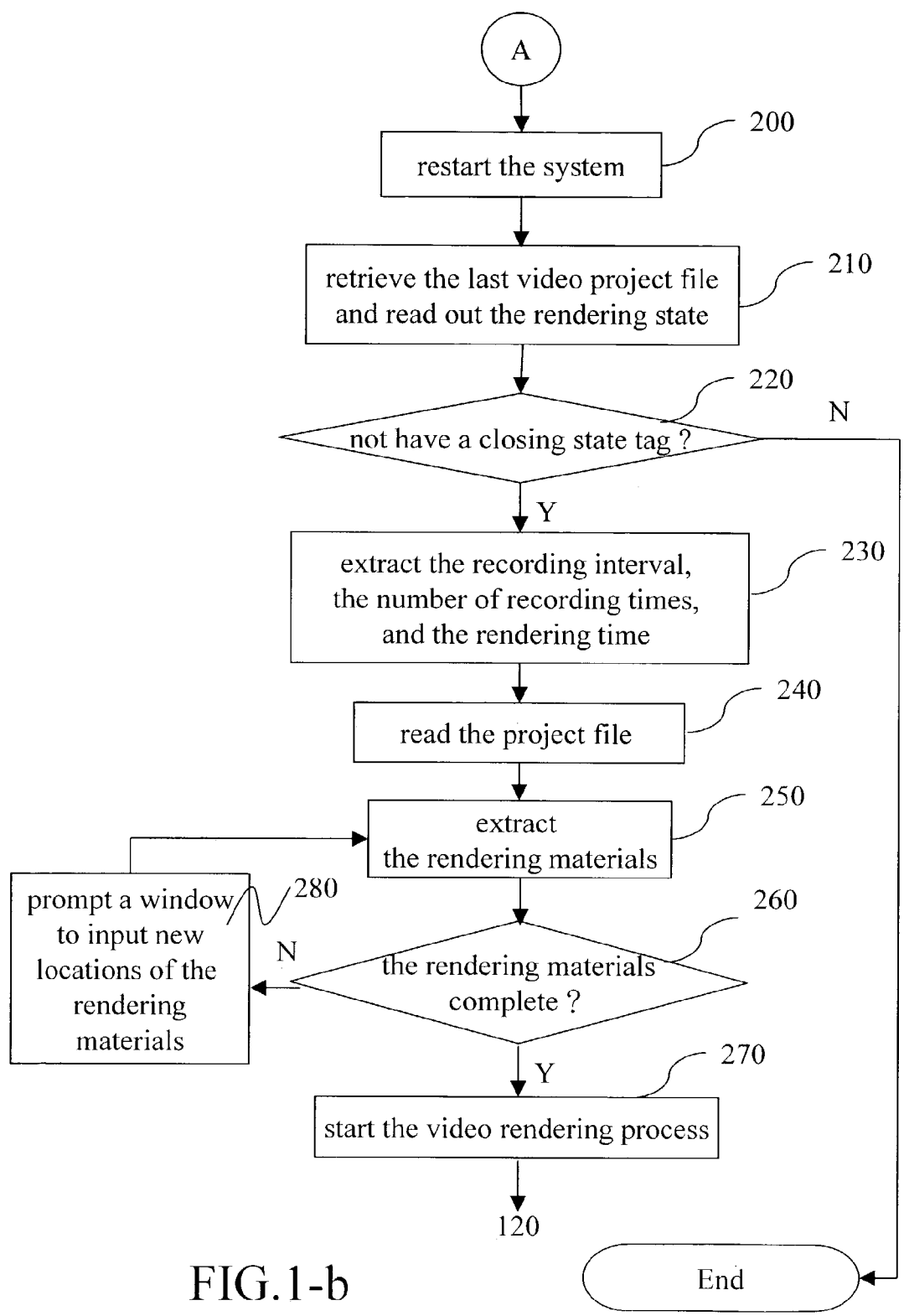
FIG.1-b

COMPUTER EXECUTABLE DIGITAL VIDEO RENDERING RESTORATION METHOD

BACKGROUND OF THE INVENTION

1. Field of Invention

The invention pertains to a computer-based digital video rendering method and, in particular, to a method that records state data periodically during the rendering process of a digital video so that the video can be immediately restored once the process is abnormally interrupted.

2. Related Art

Making digital video using computers is always a time-consuming job. Althrough with the help of computers the editing task is much easier and faster than traditional manual processing, it still takes hours or even days to render videos because of the varieties of materials used during filming and in order to produce special effects.

During the long video rendering process, the users often worry that it may be interrupted because of abnormal conditions happened to the computer. Such abnormal conditions may be caused by irregular power supply, system breakdown, etc. These problems usually result in re-doing the video rendering because the work is not saved. This would be a disaster for those who spend a lot of time rendering digital videos.

Therefore, for film companies that are devoted to developing computer-based digital video rendering software, it is among the top priorities to be able to restoring digital videos back to their original states within the shortest possible time if an abnormal interruption happens to the rendering process.

SUMMARY OF THE INVENTION

In view of the foregoing, the invention provides a computer-based digital video rendering restoration method. A primary objective of the invention is to periodically record the stata data during the digital video rendering process. If anything abnormal or interruption occurs to the rendering process, the previously stored state data can be used to return to the original rendering process.

Another objective of the invention is to temporarily record digital videos in memory in a periodic way. A flushing process is performed only after each small section of the digital video is completed. Therefore, the invention also achieves the goal for a fast and efficient digital video rendering process.

BRIEF DESCRIPTION OF THE DRAWINGS

The invention will become more fully understood from the detailed description given hereinbelow illustration only, and thus are not limitative of the present invention, and wherein:

FIG. 1-*a* is a flowchart of the disclosed computer-based digital video rendering restoration method for video rendering; and FIG. 1-*b* is a flowchart of restoring a render digital video according to the invention.

DETAILED DESCRIPTION OF THE INVENTION

The invention discloses a computer-based digital video rendering restoration method. Set by the user, the computer can automatically record state data during the digital video rendering process. If anything abnormal happens, the saved file can be immediately used to restore the state of the video rendering before the last recording. In the traditional video rendering process, only a single project file is employed to record the paths of required materials, item names of materials, length of the film, time-ordering of the film, and special effects. It does not contain any information about the state of the rendering process. Once the process is abnormally interrupted, there is no way to restore the unfinished part as long as it is not saved. The user therefore has to spend more time to re-rendering the lost video.

In the following paragraphs, we use FIG. 1-*a* and FIG. 1-*b* to explain the procedure of the disclosed method.

First, the system reads a project file (step 100). This file stores the paths of rendering materials, item names of materials, length of the film, time-ordering of the film, and special effects. These data are set by the user before rendering the video. The main purpose of this file is to perform the film making process according to the user痾 settings. Step 110 extracts the value of recording interval and counts the number of recording times. The recording interval can be set by the user in advance or predetermined using the program痾 default. The number of recording times is determined by the length of the film divided by the recording interval. For example, if the length of the film is 100 minutes and the recording interval is 10 minutes, then the number of recording times is 100/10=10. Step 120 starts the video rendering process and time-counting. The video contents are temporarily stored in memory. To reduce direct access to disk drive and increase the video rendering efficiency, the temporarily finished video is stored in the memory, which is usually random access memory (RAM). The system then determines whether the rendering process reaches the recording interval (step 130). If not yet, step 120 continues; otherwise, the video contents in the memory is flushed to the end of the temporary file in the disk drive (step 140). Afterwards, the system updates the rendering state of a restoration file (step 150). The system further determines whether the number of recording times is reached or not (step 160). If not, then the system keeps updating the rendering and time states (step 180). Otherwise, the temporary video file is closed and the rendering state recording is stopped (step 170). This concludes the whole video rendering process.

At the same time, if there is no abnormal interruption during the video rendering, the whole digital video can be smoothly completed. However, if there is any interruption (step 190), e.g. if power supply is out of order or the computer system breaks down during steps 120, 140, 150, or 170, the system enters step A to restore the video. This part is illustrated in FIG. 1-*b*.

After restarting the system automatically by the computer itself or manually (step 200), the disclosed method directly retrieves the last video project file and reads out the rendering state (step 210). The rendering state is stored in the restoration file. The file contains: paths of rendering materials, item names of materials, length of the film, the path of the project file, closing state tag, recording interval, the number of recording times, and rendering time. The system determines whether there is a closing state tag in the restoration file (step 220). If there is, it means that the previous video rendering is completed and no restoration is needed. If there is no closing state tag, then the system further extracts the recording interval, the number of recording times, and the rendering time (step 230). The rendering time records the last time point of the previous video rendering. It is compared with the number of recording times in order to determine a correct time for the video restoration. Once it is determined, the system reads the project file (step 240) and obtains the paths of rendering materials, the item names of materials, the length of the video, the time-ordering of the video, and special effects. The system extracts the rendering materials (step 250) to see if they are complete (step 260). If they are not complete, namely, the paths of rendering materials or rendering materials are destroyed such that they cannot be used, the system prompts a window for the user to input new locations of the rendering materials (step 280). After the input, the procedure goes to step 250 and starts to extract rendering materials. If the rendering materials are complete (step 260), then the video rendering process starts (step 270). After the restoration, the video rendering process enters step 120. The system starts time-counting and temporarily stores video contents in the memory. The rest of the procedure is exactly the same as that after step 120 described in FIG. 1-*a*.

Certain variations would be apparent to those skilled in the art, which variations are considered within the spirit and scope of the claimed invention.

What is claimed is:

1. A computer-based digital video rendering restoration method which processes video rendering in a time divided way so that during the video rendering the computer system periodically records state data that are to be used for restoring the video if the video rendering encounters any abnormal interruption, the method comprising:
    (1) reading a project file;
    (2) extracting a recording time interval and computing a number of recording times;
    (3) starting video rendering, time-counting, and temporarily storing video contents in memory;
    (4) flushing the video contents in the memory to the end of a temporary video file in a disk drive once the time elapse reaches the recording time interval;
    (5) updating a rendering state in a restoration file; and
    (6) closing the temporary video file, updating the rendering state and closing the video rendering once the number of recording times is reached.

2. The method of claim 1, wherein the project file in step (1) contains a path of a rendering material, the item name of the rendering material, a length of the video, a video time-ordering setting, and a special effect setting.

3. The method of claim 1, wherein the number of recording times in step (2) is obtained by dividing the length of the video by the recording time interval.

4. The method of claim 1, wherein the memory in step (3) is random access memory (RAM).

5. The method of claim 1 when one of steps (3), (4), (5), and (6) encounters an abnormal interruption further comprising the steps of:
    restarting the computer system;
    reading the rendering state;
    extracting the recording time interval, the number of recording times, and the rendering time;
    reading the project file;
    obtaining the rendering material; and
    continuing the video rendering.

6. The method of claim 5, wherein the step of extracting the rendering materials contains the step of prompting the user to enter the location of the rendering material if the rendering material is found to be incomplete.

7. The method of claim 5, wherein the step of continuing the video rendering further contains the steps of:
    starting video rendering, time-counting, and temporarily recording video contents in the memory;
    flushing the video contents in the memory to the end of the temporary video file in the disk drive once the time elapse reaches the recording time interval;
    updating the rendering state in the restoration file; and
    closing the temporary video file, updating the rendering state and closing the video rendering once the number of recording times is reached.

8. The method of claim 1, wherein when the time elapse reaches the recording time interval in step (4) the system executes the step of updating the rendering state and the time state.

9. The method of claim 1, wherein the restoration file in step (5) contains at least the path of the rendering material, the item name of the rendering material, the length of the video, the path of the project file, the closing state tag, the recording time interval, the number of recording times, and a rendering time.

10. The method of claim 1, wherein the system executes the step of updating the rendering state and the time state when the number of recording times is not reached in step (6).

11. The method of claim 1, wherein steps (3) through (5) are repeatedly executed as long as the number of recording times is not reached in step (6).

12. The method of claim 1, wherein the system executes the step of updating the rendering state and writing the closing state tag when the number of recording time is reached in step (6).

* * * * *